US012645044B2

(12) United States Patent
Beat et al.

(10) Patent No.: US 12,645,044 B2
(45) Date of Patent: Jun. 2, 2026

(54) OPTICAL FIBER CABLE WITH EMBEDDED STRENGTH MEMBERS

(71) Applicant: Sterlite Technologies Limited, Haryana (IN)

(72) Inventors: Darshana Beat, Haryana (IN); Swarnava Saha, Haryana (IN); Raj Gangwar, Haryana (IN); Abhishek Upadhyay, Haryana (IN); Vikash Shukla, Haryana (IN)

( * ) Notice: Subject to any disclaimer, the term of this patent is extended or adjusted under 35 U.S.C. 154(b) by 562 days.

(21) Appl. No.: 18/147,379

(22) Filed: Dec. 28, 2022

(65) Prior Publication Data

US 2023/0228959 A1     Jul. 20, 2023

(51) Int. Cl.
*G02B 6/44*          (2006.01)
(52) U.S. Cl.
CPC .................................. *G02B 6/4429* (2013.01)
(58) Field of Classification Search
CPC .................................................. G02B 6/4429
See application file for complete search history.

(56) References Cited

U.S. PATENT DOCUMENTS

| | | | | |
|---|---|---|---|---|
| 6,813,422 B1* | 11/2004 | Krishnamurthy | .... | G02B 6/4411 |
| | | | | 385/109 |
| 2003/0044139 A1* | 3/2003 | Norris | .................. | G02B 6/4429 |
| | | | | 385/113 |
| 2014/0029903 A1* | 1/2014 | Blazer | .................. | G02B 6/4432 |
| | | | | 427/163.2 |
| 2018/0292625 A1* | 10/2018 | Lang | .................... | G02B 6/4486 |
| 2019/0064469 A1* | 2/2019 | Kumar | ................. | G02B 6/4404 |

OTHER PUBLICATIONS

By Paschotta, Fiber Core, RP Photonics Encyclopedia, as captured by Wayback Machine on Nov. 11, 2020 (Year: 2020).*

* cited by examiner

*Primary Examiner* — Thomas A Hollweg
*Assistant Examiner* — Kirsten D. Endresen
(74) *Attorney, Agent, or Firm* — Steven R. Fairchild

(57) ABSTRACT

The present invention relates to an optical fiber cable (100) comprising an optical fiber unit (102), optical fiber (104), a tight buffer layer (106), a sheath (108), a plurality of strength members (110a, 110b, 110c), a water swellable element (112) and a filling strength member (SM) 114. In particular, the optical fiber cable (100) is an all-dielectric communication cable with a preferential bending ratio between 1-2. Moreover, the strength members (110a, 110b, 110c) have an elastic modulus greater than 45 GPa and each strength member of the plurality of strength members (110a, 110b, 110c) has a diameter between 0.4 mm to 0.8 mm.

19 Claims, 1 Drawing Sheet

100

<u>100</u>
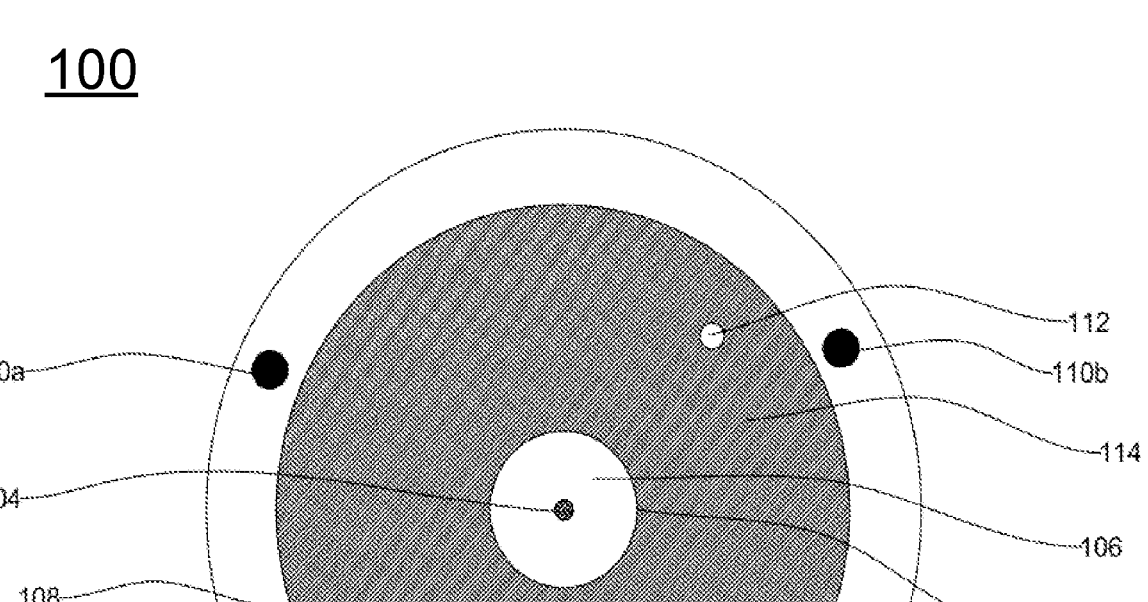

OPTICAL FIBER CABLE WITH EMBEDDED STRENGTH MEMBERS

COPYRIGHT STATEMENT

CROSS REFERENCE TO RELATED APPLICATION

This application claims the benefit of Indian Patent Application number 202211002806, entitled "OPTICAL FIBER CABLE WITH EMBEDDED STRENGTH MEMBERS" filed by the applicant on Jan. 18, 2022, which is incorporated herein by reference in its entirety.

FIELD OF THE INVENTION

Embodiments of the present invention relate to the field of optical fibers and more particularly, relate to an optical fiber cable with specifically designed strength members enhancing the preferential bending.

BACKGROUND OF THE INVENTION

Telecommunications networks include access networks where end-user subscribers connect to service providers. With the advancement of science and technology, various modern technologies are being employed for communication purposes.

Being a critical component of a modern communication network across the globe, optical fiber cables are widely used for communication to meet the increasing demands. Optical fiber cables utilize optical fibers to transmit signals such as voice, video, image, data or information. Optical fibers are strands of glass fiber processed so that light beams transmitted through the glass fiber are subject to total internal reflection wherein a large fraction of the incident intensity of light directed into the fiber is received at the other end of the fiber.

To provide improved performance to subscribers, fiber optic networks are increasingly providing optical fiber connectivity directly to the subscribers. As part of various fiber-to-the-premises (FTTP), fiber-to-the-home (FTTH), and other initiatives (generally described as FTTX), such fiber optic networks are providing the optical signals from distribution cables through local convergence points ("LCPs") to fiber optic cables, such as drop cables, that are run directly to the subscribers' premises. Thus, installation of the optical fiber cables at a rapid pace has become essential.

The optical fiber cables consist of a number of optical fibers. An exemplary commercially available optical fiber cable that can find use in local distribution plant comprises a central (steel or polymer) strength member surrounded by a polyurethane jacket, a multiplicity of fiber-containing loose tubes stranded around the polyurethane jacket, polyester tape and a polyethylene inner jacket surrounding the tubes, and steel or Al armor and a polyethylene outer jacket surrounding the inner jacket.

However, the optical fibers may or may not be enclosed inside buffer tubes. The number of buffer tubes or optical fibers constitutes a core of the optical fiber cable. In addition, the core may be surrounded by one or more layers surrounded by a sheath. The sheath protects the optical fiber cable against any mechanical breakage. To prevent or reduce excessive bending, cable strength members may be disposed within a cable jacket or the sheath of the fiber optic cable along with the optical fibers. The strength members provide mechanical stability to the optical fiber cable. Currently, there are a few prior arts providing optical fiber cables with multiple embedded strength members.

Japanese patent application no. JP2012203199A titled "Optical fiber cable" discloses a cable consisting of a centrally located plastic tube containing optical fibers and tensile members embedded in the jacket of the cable.

U.S. Pat. No. 6,546,176B2 titled "Optical fiber cable and core with a reinforced buffer tube having visible strength members and methods of manufacture thereof" discloses an optical fiber cable which includes a buffer tube containing at least one optical fiber and reinforced by at least two substantially radially incompressible longitudinal strength members.

U.S. Pat. No. 7,330,621B2 titled "Flexible optical closure and other flexible optical assemblies" discloses optical fiber assemblies with one or more strength members embedded in the sheath.

U.S. Pat. No. 9,891,397B2 titled "Multi-fiber, fiber optic cables and cable assemblies providing constrained optical fibers within an optical fiber sub-unit" discloses an optical fiber sub-unit comprising optical fibers disposed adjacent a sub-unit strength members within a sub-unit jacket.

U.S. Pat. No. 4,723,831A titled "Optical fiber communications cable" discloses an optical fiber cable further comprising three non-metallic strength members (or groups of strength members) completely embedded in the first jacket and coupled thereto.

However, there are a number of drawbacks in the current technologies employing multiple strength members. The optical fibers may engage and become entangled with the strength members thereby bending the optical fibers inside the cable jacket and attenuating the optical signals carried on the optical fibers. Moreover, the strength members are not well coupled to the outside jacket in the current designs.

Dissimilar embedded strength members are needed to provide the required mechanical tensile strength to the fiber as well as to maintain the lower breaking load of the cable. Although some optical fiber cables employ dissimilar embedded strength members, there are a number of drawbacks associated with them. The dissimilar strength members embedded in the jacket are not good to provide uniform bending stiffness to the optical fiber cable. Furthermore, none of the prior arts provide dissimilar strength members with large bending capacity.

Accordingly, to overcome the disadvantages of the prior arts, there is a need for a technical solution that overcomes the above-stated limitations in the prior arts. The present invention provides an optical fiber cable with specifically designed strength members enhancing the preferential bending.

SUMMARY OF THE INVENTION

Embodiments of the present invention relate to an optical fiber cable comprising at least one optical fiber unit having at least one fiber, a sheath encapsulating at least one optical fiber unit and a plurality of strength members embedded in the sheath. In particular, the optical fiber cable has a preferential bending ratio between 1-2. Moreover, the optical fiber cable is an all-dielectric communication cable.

In accordance with an embodiment of the present invention, the plurality of strength members have an elastic modulus greater than 45 GPa.

In accordance with an embodiment of the present invention, the optical fiber cable further comprises at least one water-swellable element between the optical fiber unit and the sheath.

In accordance with an embodiment of the present invention, a cabled fiber strain maybe equal to or less than 20% of fiber proof test strain at long-term load.

In accordance with an embodiment of the present invention, cabled fiber strain maybe equal to or less than 60% of fiber proof test strain at maximum load.

In accordance with an embodiment of the present invention, the optical fiber cable further comprises at least three strength members such that at least one strength member has diameter different than other strength member.

In accordance with an embodiment of the present invention, the optical fiber cable further comprises at least three strength members such that all strength members have same diameters.

In accordance with an embodiment of the present invention, each strength member of the plurality of strength members has a diameter between 0.4 mm-0.8 mm.

In accordance with an embodiment of the present invention, a ratio of diameters of any two strength members of the plurality of strength members is equals to or less than 2.

In accordance with an embodiment of the present invention, the optical fiber cable may be bent at a minimum curvature of 7 times the cable outer diameter.

In accordance with an embodiment of the present invention, the optical fiber unit further comprises a tight buffer layer.

In accordance with an embodiment of the present invention, the optical fiber cable further comprises at least one filling strength member (SM).

In accordance with an embodiment of the present invention, the fiber further comprises an inner core region and an outer cladding region. In particular, refractive index of the inner core region is greater than refractive index of the outer cladding region.

In accordance with an embodiment of the present invention, the sheath is a high density polyethylene (HDPE) jacket.

In accordance with an embodiment of the present invention, the optical fiber cable further comprises at least three strength members placed at an angle of 120 degrees with each other from the centre of the optical fiber cable. Particularly, the strength members of the plurality of strength members have a diameter of 0.7 mm and the strength member has a diameter of 0.5 mm.

In accordance with an embodiment of the present invention, the optical fiber cable has a breaking load between 1350-2000 N.

In accordance with an embodiment of the present invention, the plurality of strength members are made from any of an aramid reinforcement plastic (ARP), a fiber-reinforcement plastic (FRP) and the like.

In accordance with an embodiment of the present invention, at least one fiber (104) is longitudinally placed extending along the length of the optical fiber cable.

The foregoing objectives of the present invention are attained by providing an optical fiber cable with specifically designed strength members enhancing the preferential bending.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The invention herein will be better understood from the following description with reference to the drawings, in which FIG. 1 is a cross-sectional view illustrating an exemplary optical fiber cable with dissimilar plurality of strength members in accordance with one embodiment of the present invention.

ELEMENT LIST

Optical fiber cable—100
Optical fiber unit—102
Fiber—104
Tight buffer layer—106
Sheath—108
Plurality of strength members—110*a*, 110*b*, 110*c*
Water swellable element—112
Filling strength member (SM)—114

The optical fiber cable is illustrated in the accompanying drawings, which like reference letters indicate corresponding parts in the various figures. It should be noted that the accompanying FIGURE is intended to present illustrations of exemplary embodiments of the present invention. This FIGURE is not intended to limit the scope of the present invention. It should also be noted that the accompanying FIGURE is not necessarily drawn to scale.

DETAILED DESCRIPTION OF THE INVENTION

The principles of the present invention and their advantages are best understood by referring to FIG. 1. In the following detailed description, numerous specific details are set forth in order to provide a thorough understanding of the embodiment of the invention as illustrative or exemplary embodiments of the invention, specific embodiments in which the invention may be practised are described in sufficient detail to enable those skilled in the art to practice the disclosed embodiments. However, it will be obvious to a person skilled in the art that the embodiments of the invention may be practised with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or"

is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

An optical fiber cable includes one or more fibers and carries information in the form of data between two places using light technology. Moreover, the optical fiber cable is a cable used for carrying light over long distances. Furthermore, the optical fiber cable may simply be used to transmit optical signals (which may carry sensor data or communication data). The optical fiber cable is used for telecommunication applications, data centers and the like.

Fiber is used for transmitting information at light pulses from one end to another. In particular, at least one fiber is configured to transmit large amounts of information over long distances with relatively low attenuation.

The bending stiffness is a measure of resistance of the optical fiber cable to bend in a plane perpendicular to the longitudinal axis. In particular, the bending stiffness is calculated by referring to a method E17B set forth by IEC 60794-1-2.

The preferential bending ratio is the ratio of the maximum and minimum value from the set of the calculated bending stiffness. In particular, the preferential bending ratio is the maximum range to which a cable may be bent without damaging the quality of fiber.

The fiber proof test is a technique to ensure the minimum strength of an optical fiber. In the fiber proof test, a predetermined load is applied on the fiber by tensile loading. The fiber breaks at weak points and the weak points are eliminated from the fiber. Moreover, the fiber proof test guarantees a minimum strength level of the fiber for lifetime.

The long-term load refers to the minimum load that acts upon the cable after the cable is installed. In particular, the maximum load is the maximum load developed on the optical fiber cable due to external forces after the optical fiber cable is installed and during the installation of the optical fiber cable.

Elastic modulus is a quantity that measures an object's resistance to deformation upon application of stress. In particular, the elastic modulus is directly proportional to the stiffness of any material.

The minimum curvature is directly proportional to the minimum bending radius. In particular, the minimum bending radius is directly proportional to the flexibility and handling of the optical fiber cable. Moreover, the minimum bend radius is the smallest allowed radius the cable is allowed to bend around and without impacting the optical performance of the cable.

Terms "sheath 108" or "outer jacket 108" are interchangeably used throughout the draft for convenience.

Referring to FIG. 1 illustrates a cross sectional view of an exemplary optical fiber cable 100 in accordance with one embodiment of the present invention. The optical fiber cable 100 comprises at least one optical fiber unit 102, at least one fiber 104, a tight buffer layer 106, a sheath 108, a plurality of strength members 110a, 110b, 110c, at least one water swellable element 112 and at least one filling strength member (SM) 114.

In accordance with an embodiment of the present invention, the optical fiber cable 100 is an all-dielectric communication cable.

Moreover, the optical fiber cable 100 includes at least one optical fiber unit 102. Furthermore, at least one optical fiber unit 102 includes at least one fiber 104 and the tight buffer layer 106.

In accordance with an embodiment of the present invention, at least one fiber longitudinally 104 extends along a length of the optical fiber cable 100. In particular, at least one fiber 104 includes a core region and a cladding region. The core region is an inner part of an optical fiber and the cladding section is an outer part of the optical fiber. Moreover, the core region is defined by a central longitudinal axis of at least one fiber 104. The cladding region surrounds the core region.

Furthermore, the core region and the cladding region are formed along the central longitudinal axis of each of at least one fiber 104 during the manufacturing stage of at least one fiber 104. Further, the core region has a refractive index greater than a refractive index of the cladding region.

In one embodiment, the core region has a higher refractive index than the cladding region.

Further, the optical fiber cable 100 includes the sheath 108 that surrounds at least one optical fiber unit 102.

In one embodiment, the sheath 108 is made of a high density polyethylene (HDPE) jacket. Alternatively, the sheath 108 may be made of any other material. Moreover, the thickness of the sheath 108 may vary.

In an embodiment, the sheath 108 is black in color. Alternatively, the sheath 108 may be of any color.

The sheath 108 layer directly interacts with the ambient environment. Moreover, the outer sheath 108 is a sheathing layer. The sheath 108 protects the optical fiber cable 100 against crush, bend and tensile stress along the length of the optical fiber cable 100. Furthermore, the sheath 108 includes the plurality of strength members 110a, 110b and 110c. The plurality of strength members 110a, 110b and 110c are dissimilar or similar in sizes.

In accordance with an embodiment of the present invention, the two strength members 110a and 110b are 0.7 mm in thickness or diameters and the third strength member 110c is 0.5 mm in thickness or diameter.

In accordance with another embodiment, each of the plurality of strength members 110a, 110b, 110c has a diameter between 0.4 mm-0.8 mm.

In another embodiment, the ratio of diameters of any two strength members of the plurality of strength members 110a, 110b, 110c is equal to or less than 2.

In accordance with an embodiment of the present invention, the placement and the size of the plurality of strength members 110a, 110b and 110c affects the bending stiffness of the optical fiber cable 100. The placement of the bending plane can be a set of combinations based on the design of the cable which changes the bending stiffness value for each combination.

In accordance with an embodiment of the present invention, the preferential bending ratio is less than 2 to achieve a flexible and long life optical fiber cable 100. Alternatively, the preferential bending ratio may be of any other value. The preferential bending ratio equals to or below than 2 is calculated for the plurality of strength members 110a, 110b and 110c. Moreover, the diameter within 0.4-0.8 mm of the plurality of strength members 110a, 110b and 110c helps in achieving a strain equal to or less than 20% of the fiber test proof strain at long-term load. Furthermore, the diameter within 0.4-0.8 mm helps in achieving a strain equal to or less than 60% of the fiber proof test at maximum load.

In an embodiment, the cabled fiber strain is equal to or less than 20% of the fiber proof test strain at long-term load. Moreover, the cabled fiber strain is equal to or less than 60% of the fiber proof test strain at maximum load. Furthermore, the life of the optical fiber cable 100 is more than 25 years when the optical fiber cable 100 falls under the category. However, the life of the optical fiber cable 100 deteriorates when the optical fiber cable 100 does not fall under the category.

In accordance with an embodiment of the present invention, breaking load of the optical fiber cable 100 having plurality of strength members 110a, 110b, 110c with the dissimilar or similar diameters within 0.4-0.8 mm is between 1350-2000N. Alternatively, the breaking load of the optical fiber cable 100 may be of any other value. In particular, the breaking load of 1350-2000N is not achieved when the plurality of strength members 110a, 110b, 110c have diameters of any other value other than dissimilar or similar diameters within 0.4-0.8 mm.

In accordance with an exemplary example, the plurality of strength members 110a, 110b, 110c are made of a aramid reinforcement plastic (ARP), a fiber-reinforcement plastic (FRP) and the like.

In accordance with an embodiment of the present invention, the plurality of strength members 110a, 110b, 110c are placed at 120 degrees with each other from the centre of the optical fiber cable 100. In particular, the 120 degrees placement allows even distribution of load among each three of the plurality of strength members 110a, 110b and 110c. Alternatively, the plurality of strength members 110a, 110b, 110c may be placed at any angle from the centre of the optical fiber cable 100.

Moreover, the plurality of strength members 110a, 110b, 110c have an elastic modulus greater than 45 Gpa.

In an embodiment, a high elastic modulus is selected for the plurality of strength members 110a, 110b, 110c. Particularly, the optical fiber cable 100 is a dielectric self supporting (ADSS) optical fiber cable that is aerially suspended between poles. The optical fiber cable 100 uses the higher elastic modulus to support the cable without any metallic or conductive material. The strain values are not achieved when the elastic modulus of the optical fiber cable 100 falls below 45 Gpa.

In accordance with an embodiment of the present invention, the optical fiber cable 100 may be bent at a minimum curvature of 7 times the cable outer diameter. The minimum bending radius is measured as the product of cable outer diameter and cable multiplier. Moreover, the cable multipliers are determined by industry standards and vary depending on the cable type. However, the quality of the optical fiber cable 100 may be damaged when the cable multipliers are reduced below 7.

In an exemplary example, a cable with 5 mm outer diameter bends at 35 mm of minimum radius without any damage. However, the same cable provides a minimum bend radius of 30 mm at minimum curvature of 6 times the cable outer diameter may damage the quality of cable.

In accordance with an embodiment of the present invention, the optical fiber cable 100 includes at least one water swellable element 112 between the optical fiber unit 102 and the sheath 108. Alternatively, at least one water swellable element 112 maybe placed at a different location. The water swellable element 112 prevents ingression of water in the stranded core of the optical fiber cable 100.

Moreover, the optical fiber cable 100 includes the filling strength member 114. The filling strength member 114 provides mechanical support to the optical fiber cable 100. Furthermore, the filling strength member 114 resists change in deformation of the optical fiber cable 100 upon stress application.

The present invention of the optical fiber cable 100 with specifically designed strength members 110a, 110b, 110c enhancing the preferential bending provides a number of advantages. In particular, the present invention provides a flexible optical fiber cable 100 with the plurality of strength members 110a, 110b, 110c. Moreover, the present invention provides a lowered cable bending radius without disturbing the optical quality of the fiber 104 as well as the cable 100. Furthermore, the present invention provides easy coiling and handling of the cable 100 resulting in easy and reduced installation time. Further, the present invention maximizes the life of the cable 100 and the fiber 104 with low breaking load of the cable 100.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:
1. An optical fiber cable (100)
comprising: at least one optical fiber unit (102) having at least one fiber (104);
a sheath (108) encapsulating the at least one optical fiber unit (102);

a plurality of strength members (110a, 110b, 110c) embedded in a sheath (108), wherein the optical fiber cable (100) has a preferential bending ratio greater than 1 and less than 2, the preferential bending ratio is a ratio of a maximum bending stiffness value to a minimum bending stiffness value of the optical fiber cable (100), the bending stiffness being a measure of resistance of the optical fiber cable (100) to bend in a plane perpendicular to the longitudinal axis of the optical fiber cable (100), as measured in accordance with IEC 60794-1-2, method E17B, the bending stiffness values being determined for a set of bending planes defined by placement and size of the plurality of embedded strength members (110a, 110b, 110c), wherein the plurality of strength members (110a, 110b, 110c) comprise at least three strength members, and, wherein each strength member of the plurality of strength members (110a, 110b, 110c) has a diameter between 0.4 mm and 0.8 mm.

2. The optical fiber cable (100) as claimed in claim 1, wherein the optical fiber cable (100) is an all-dielectric communication cable.

3. The optical fiber cable (100) as claimed in claim 1, wherein the plurality of strength members (110a, 110b, 110c) have an elastic modulus greater than 45 Gpa.

4. The optical fiber cable (100) as claimed in claim 1, further comprising at least one water swellable element (112) between the optical fiber unit (102) and the sheath (108).

5. The optical fiber cable (100) as claimed in claim 1, wherein a cabled fiber strain may be equal to or less than 20% of fiber proof test strain at long-term load.

6. The optical fiber cable (100) as claimed in claim 1, wherein cabled fiber strain may be equal to or less than 60% of fiber proof test strain at maximum load.

7. The optical fiber cable (100) as claimed in claim 1, wherein at least one strength member of the at least three strength members (110a, 110b, 110c) has a diameter different than another strength member.

8. The optical fiber cable (100) as claimed in claim 7, wherein a ratio of diameters of any two strength members of the plurality of strength members (110a, 110b, 110c) is equal to or less than 2.

9. The optical fiber cable (100) as claimed in claim 7, wherein the optical fiber cable (100) may be bent at a minimum curvature of 7 times the cable outer diameter.

10. The optical fiber cable (100) as claimed in claim 7, wherein at least two strength members (110a, 110b) of the plurality of strength members (110a, 110b, 110c) have a diameter of 0.7 mm and at least one strength member (110c) of the plurality of strength members (110a, 110b, 110c) has a diameter of 0.5 mm.

11. The optical fiber cable (100) as claimed in claim 7, wherein the optical fiber cable (100) has a breaking load between 1350 N and 2000 N.

12. The optical fiber cable (100) as claimed in claim 7, wherein the plurality of strength members (110a, 110b, 110c) are made from any of an aramid reinforcement plastic (ARP) and a fiber-reinforcement plastic (FRP).

13. The optical fiber cable (100) as claimed in claim 7, wherein the at least one fiber (104) is longitudinally placed extending along the length of the optical fiber cable (100).

14. The optical fiber cable (100) as claimed in claim 1, wherein all strength members (110a, 110b, 110c) have equal diameters.

15. The optical fiber cable (100) as claimed in claim 1, wherein the optical fiber unit (102) further comprises a tight buffer layer (106).

16. The optical fiber cable (100) as claimed in claim 1, further comprising at least one filling strength member (SM) (114).

17. The optical fiber cable (100) as claimed in claim 1, wherein the fiber (104) further comprises an inner core region and an outer cladding region; wherein a refractive index of the inner core region is greater than a refractive index of the outer cladding region.

18. The optical fiber cable (100) as claimed in claim 1, wherein the sheath 108 is a high density polyethylene (HDPE) jacket.

19. The optical fiber cable (100) as claimed in claim 1, wherein the plurality of strength members (110a, 110b, 110c) placed at an angle of 120 degrees with each other from the centre of the optical fiber cable (100).

* * * * *